(12) United States Patent
Wang et al.

(10) Patent No.: US 12,025,849 B2
(45) Date of Patent: Jul. 2, 2024

(54) FOLLOW FOCUS DEVICE AND GIMBAL HAVING THE SAME

(71) Applicant: SZ DJI TECHNOLOGY CO., LTD., Shenzhen (CN)

(72) Inventors: Ruzhi Wang, Shenzhen (CN); Hao Wang, Shenzhen (CN); Paul Pan, Shenzhen (CN); Weidong Li, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 836 days.

(21) Appl. No.: 16/952,956

(22) Filed: Nov. 19, 2020

(65) Prior Publication Data

US 2021/0072491 A1    Mar. 11, 2021

Related U.S. Application Data

(63) Continuation of application No. PCT/CN2018/093396, filed on Jun. 28, 2018.

(51) Int. Cl.
*G02B 7/04* (2021.01)
*G02B 7/02* (2021.01)
(Continued)

(52) U.S. Cl.
CPC ............... *G02B 7/04* (2013.01); *G02B 7/023* (2013.01); *G03B 13/34* (2013.01); *G03B 17/561* (2013.01)

(58) Field of Classification Search
None
See application file for complete search history.

(56) References Cited

U.S. PATENT DOCUMENTS

| 2003/0025802 A1* | 2/2003 | Mayer, Jr. | G03B 17/38 |
| | | | 348/E5.042 |
| 2008/0225234 A1* | 9/2008 | Bauer | H04N 23/67 |
| | | | 348/E5.045 |

(Continued)

FOREIGN PATENT DOCUMENTS

| CN | 201984196 U | 9/2011 |
| CN | 203950104 U | 11/2014 |

(Continued)

OTHER PUBLICATIONS

The World Intellectual Property Organization (WIPO) International Search Report for PCT/CN2018/093396 dated Apr. 1, 2019 6 pages.

*Primary Examiner* — Rodney E Fuller
(74) *Attorney, Agent, or Firm* — ANOVA LAW GROUP, PLLC

(57) ABSTRACT

A follow focus device for a gimbal carrying an image capturing device includes a power assembly connected to the image capturing device, a connection member, and an adjustment member electrically connected to the power assembly. The power assembly is configured to adjust at least one lens parameter of the image capturing device. The connection member is configured to fix the power assembly to the gimbal. The adjustment member generates a control signal to adjust the lens parameter of the image capturing device. The power assembly receives the control signal from the adjustment member and, based on the control signal, rotates a part of the image capturing device to adjust the lens parameter of the image capturing device.

20 Claims, 16 Drawing Sheets

(51) Int. Cl.
*G03B 13/34* (2021.01)
*G03B 17/56* (2021.01)

(56) References Cited

U.S. PATENT DOCUMENTS

| | | | | |
|---|---|---|---|---|
| 2013/0271619 | A1* | 10/2013 | Longmore | H04N 23/66 348/211.99 |
| 2014/0016920 | A1* | 1/2014 | Luo | G02B 7/10 396/144 |
| 2015/0131983 | A1* | 5/2015 | Thayer | G03B 13/34 396/56 |
| 2015/0138427 | A1* | 5/2015 | Kennedy | H04N 23/631 348/345 |
| 2017/0026575 | A1 | 1/2017 | Vegh | |
| 2017/0230565 | A1* | 8/2017 | Silva | H04N 23/53 |

FOREIGN PATENT DOCUMENTS

| | | | | |
|---|---|---|---|---|
| CN | 105519093 | A | | 4/2016 |
| CN | 205173424 | U | | 4/2016 |
| CN | 206302484 | U | * | 7/2017 |
| CN | 108184067 | A | * | 6/2018 ......... H04N 5/23203 |
| CN | 108184067 | A | | 6/2018 |
| CN | 208334863 | U | | 1/2019 |
| WO | WO-2017066946 | A1 | * | 4/2017 ............. F16D 1/101 |

\* cited by examiner

FOLLOW FOCUS DEVICE AND GIMBAL HAVING THE SAME

CROSS-REFERENCE TO RELATED APPLICATION

This application is a continuation of International Application No. PCT/CN2018/093396, filed on Jun. 28, 2018, the entire content of which is incorporated herein by reference.

TECHNICAL FIELD

The present disclosure relates to the technical field of gimbal and, in particular, relates to a follow focus device and a gimbal having the same.

BACKGROUND

When taking photographs, to obtain a smooth captured image, a gimbal may be often used to mount an image capturing device. When the gimbal is in operation, if lens parameters (e.g., focal length, aperture, etc.) of the image capturing device are directly adjusted by manually rotating the lens, it may have a relatively great impact on the captured image.

Currently, one solution to the above problem is to adjust lens parameters of the image capturing device by using a follow focus device. In such solution, a power assembly of the follow focus device may generally be fixed on an axis assembly of the gimbal. A relative position between the power assembly and the image capturing device may change as a position of the axis assembly of the image capturing device changes when the image capturing device is adjusted for balance, which may cause misalignment of the power assembly and the image capturing device. At this point, the power assembly and the image capturing device may need to be moved repeatedly to be leveled, and the adjustment process can be time-consuming and laborious, which often brings trouble to the user.

The disclosed methods and systems are directed to solve one or more problems set forth above and other problems.

SUMMARY

According to one aspect of the present disclosure, a follow focus device for a gimbal carrying an image capturing device is provided. The follow focus device includes a power assembly connected to the image capturing device, a connection member, and an adjustment member electrically connected to the power assembly. The power assembly is configured to adjust at least one lens parameter of the image capturing device. The connection member is configured to fix the power assembly to the gimbal. The adjustment member generates a control signal to adjust the lens parameter of the image capturing device. The power assembly receives the control signal from the adjustment member and, based on the control signal, rotates a part of the image capturing device to adjust the lens parameter of the image capturing device.

According to another aspect of the present disclosure, a gimbal is provided. The gimbal includes a hand-held assembly, an axis assembly fixed on the hand-held component, a carrying part connected with the axis assembly, and at least one follow focus device. The carrying part is configured to fix an image capturing device. The follow focus device includes a power assembly connected to the image capturing device, a connection member, and an adjustment member electrically connected to the power assembly. The power assembly is configured to adjust at least one lens parameter of the image capturing device. The connection member is configured to fix the power assembly to the carrying part. The adjustment member generates a control signal to adjust the lens parameter of the image capturing device. The power assembly receives the control signal from the adjustment member and, based on the control signal, rotates a part of the image capturing device to adjust the lens parameter of the image capturing device.

Other aspects of the present disclosure can be understood by those skilled in the art in light of the description, the claims, and the drawings of the present disclosure.

BRIEF DESCRIPTION OF THE DRAWINGS

In order to more clearly describe the technical solutions in the embodiments of the present disclosure, the following will briefly introduce the drawings needed in the description of the embodiments. Apparently, the drawings in the following description are only some embodiments of the present disclosure. For those of ordinary skill in the art, other drawings can be obtained without creative efforts based on the drawings.

REFERENCE NUMERALS

100: hand-held assembly; 110: first electrical matching part; 120: second electrical matching part; 200: axis assembly; 210: yaw axis assembly; 220: pitch axis assembly; 230: roll axis assembly; 300: image capturing device; 400: carrier part; 500: follow focus device; 1: power assembly; 11: electric motor; 111: housing; 13: connection wire; 14: fixed member; 141: plug-in hole; 15: third inclined surface; 12: transmission assembly; 121: tooth rack; 1211: main body part; 1212: fixed part; 1213: tooth part; 1214: locking slot; 1215: engagement tooth; 1216: first inclined surface; 1217: second inclined surface; 1218: gripping end; 122: gear; 2: connection member; 21: first connection part; 22: second connection part; 3: adjustment member; 31: adjustment part; 32: detection circuit; 33: first electrical connection part; 34: first fixed end; 600: main control board; 700: adjustment device; 710: controller; 720: second electrical connection part; 730: input device; 731: display screen; 732: button/knob; 740: second fixed end; 750: protrusion part; 760: third electrical connection part; 770: third mounting part; and 800: elevation block.

DETAILED DESCRIPTION

The technical solutions in the embodiments of the present disclosure will described below in conjunction with the drawings. Apparently, the described embodiments are only some embodiments of the present disclosure but not all of them. Based on the described embodiments of the present disclosure, all other embodiments obtained by those of ordinary skill in the art without creative efforts shall fall within the scope of the disclosure.

In conjunction with the accompanying drawings, a follow focus device and a gimbal including the follow focus device provided by the present disclosure will be described in detail below. In the case of no conflict existing, the following embodiments and features in the implementation can be combined with each other.

Figure 1:
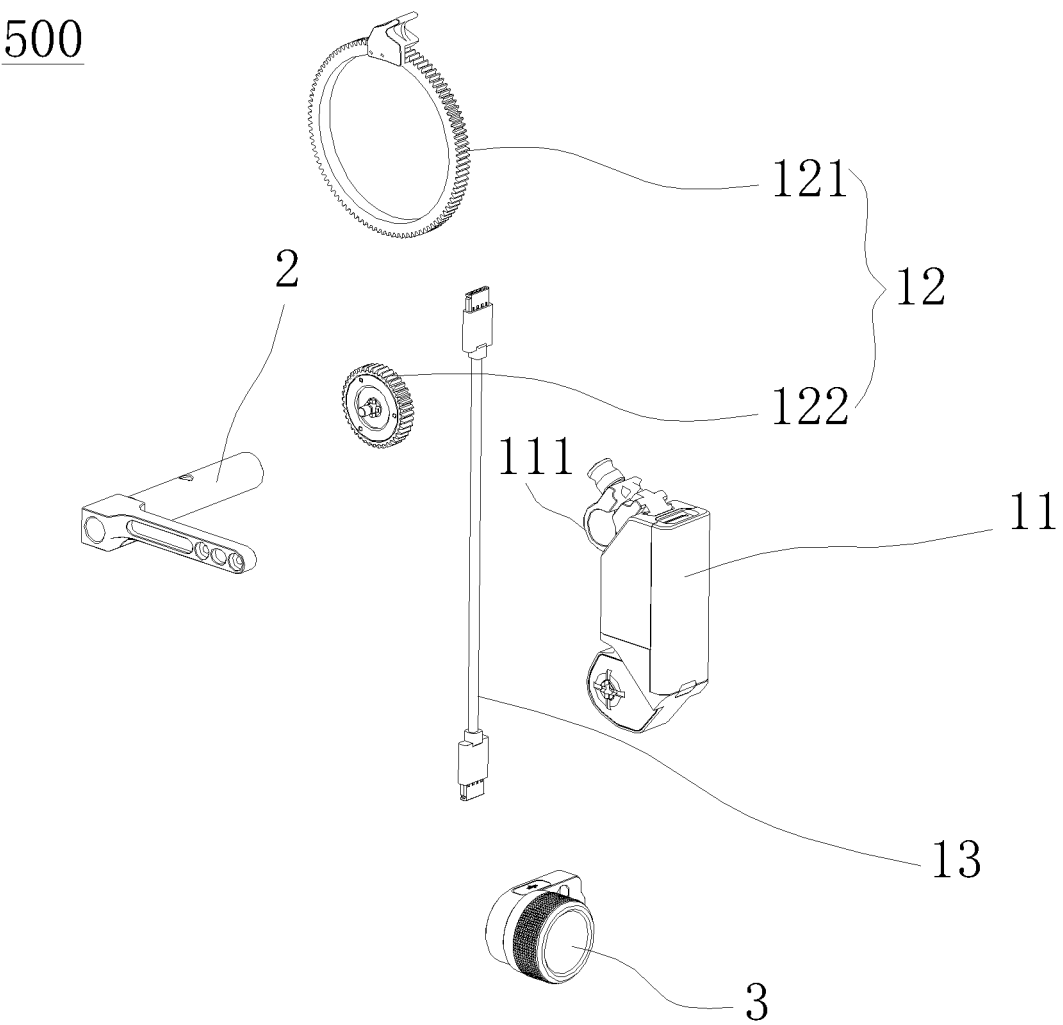
FIG. 1 is a schematic diagram of a structure of a focus adjustment device according to an embodiment of the present disclosure.

In conjunction with FIGS. 1 and 7-9, in an embodiment of the present disclosure, the follow focus device 500 may be applied to the gimbal for carrying an image capturing device 300. Referring to FIG. 1, the follow focus device 500 may include a power assembly 1, a connection member 2, and an adjustment member 3 for adjusting lens parameters of the image capturing device. The connection member 2 may be configured to fix the power assembly 1 on a carrying part 400 of the gimbal, and in some embodiments, the carrying part 400 may be configured to carry the image capturing device 300, which can be a camera or an imaging unit assembled by a lens and an image sensor. The power assembly 1 may be configured to connect to the image capturing device 300, and the adjustment member 3 may be electrically connected to the power assembly 1. In some embodiments, the adjustment member 3 may generate a control signal, and the power assembly 1 can rotate according to the control signal to drive a part of the image capturing device 300 to rotate for adjusting the lens parameters of the image capturing device 300. In some embodiments, the follow focus device 500 may fix the power assembly 1 on the carrying part 400 of the gimbal through the connection member 2, that is, fix the power assembly 1 and the image capturing device 300 on the same component, and a relative position between the power assembly 1 and the image capturing device 300 may not change as the position of the axis assembly of the gimbal relative to the image capturing device 300 changes when the image capturing device 300 is adjusted for balance. Moreover, the power assembly 1 and the image capturing device 300 can be leveled as a whole, which is convenient and quick.

It should be noted that in some embodiments, the control signal may be configured to indicate a magnitude of a rotational driving force output by the power assembly 1. For example, when the power assembly 1 includes an electric motor 11, the control signal may be configured to indicate a rotation angle of the circuit.

The power assembly 1 may include a power output device and a transmission assembly 12 connected to the power output device. In some embodiments, the transmission assembly 12 may be connected to the power output device at one end and the image capturing device 300 at the other end. The power output device can transmit the rotational driving force to the image capturing device 300 through the transmission assembly 12 to drive a part of the image capturing device 300 to rotate for adjusting the lens parameters of the image capturing device 300. For example, the power output device may match with the transmission assembly 12 to drive a lens barrel of the image capturing device 300 to rotate relative to a body of the image capturing device 300 for adjusting values of the lens parameters of the image capturing device 300.

The power output device may be the electric motor 11 or may be other devices capable of outputting power to make the transmission assembly 12 to rotate. In one embodiment, the power output device may be the electric motor 11. Further, the transmission assembly 12 may be a belt pulley, a worm gear, a gear 122, a connection rod, or other components capable of transmitting power. In one embodiment, referring to FIGS. 1 and 7-9, the transmission assembly 12 may include a tooth rack 121 connected to the image capturing device 300 and a gear 122 connected to the electric motor 11. The gear 122 may mesh with the tooth rack 121, and through the meshing of the gear 122 with the tooth rack 121, the rotational driving force output by the electric motor 11 can be transmitted to the lens barrel of the image capturing device 300, thereby adjusting the image capturing device 300. The lens barrel rotates relative to the main body of the image capturing device 300 to change the lens parameters of the image capturing device 300.

Figure 2:
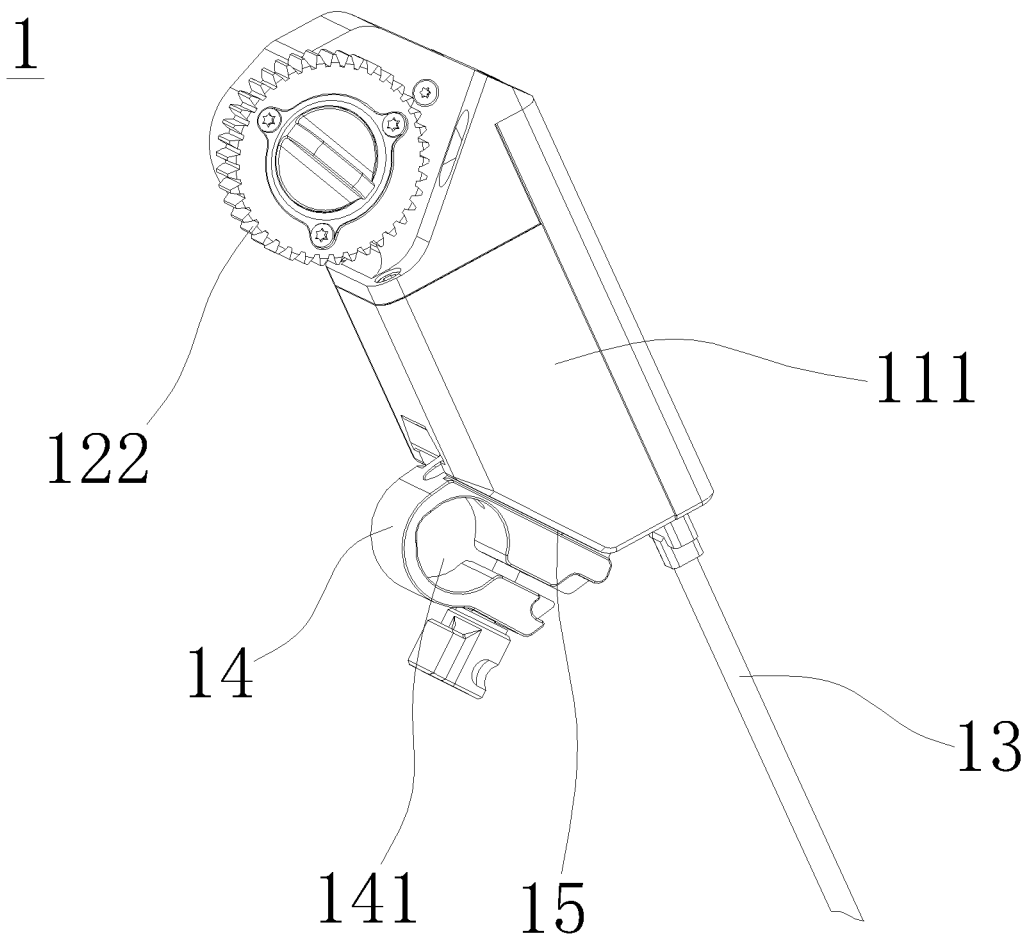
FIG. 2 is a partial structural diagram of a power assembly according to an embodiment of the present disclosure.

Referring to FIG. 2, the electric motor 11 may include a housing 111 and a main shaft, and an inner ring of the gear 122 may be directly or indirectly connected to the main shaft. The other structure of the motor 11 will be further described.

The following describes the specific structure of the tooth rack 121 according to an embodiment with reference to FIGS. 3A-3D.

Figure 3A:
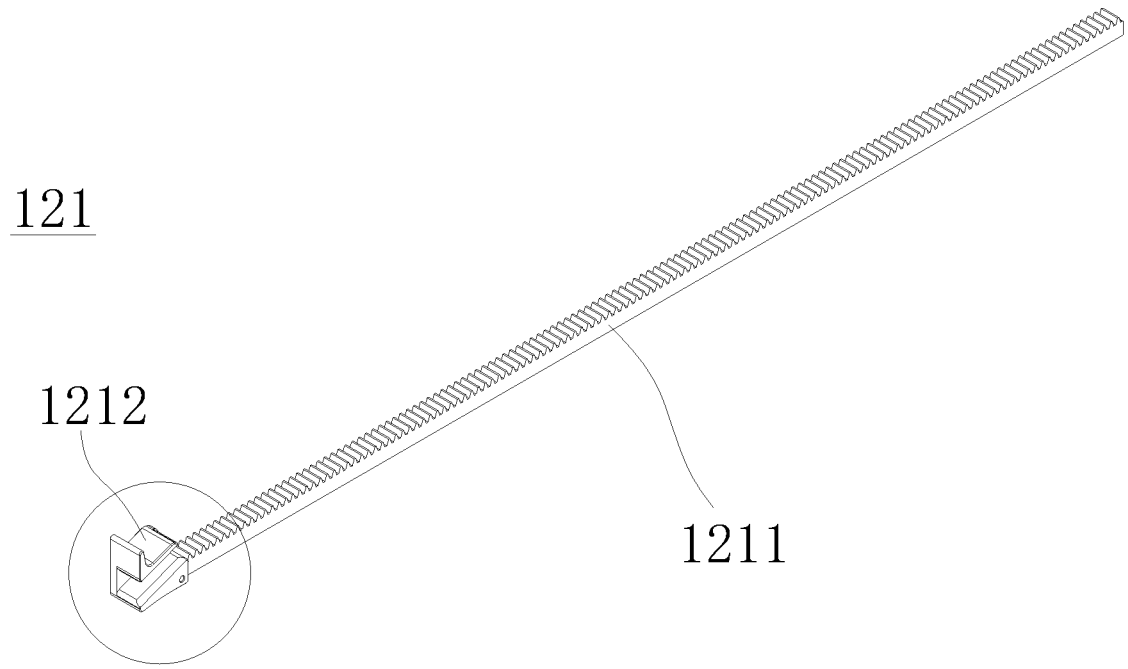
FIG. 3A illustrates a perspective view of a transmission assembly according to an embodiment of the present disclosure.
Figure 3B:
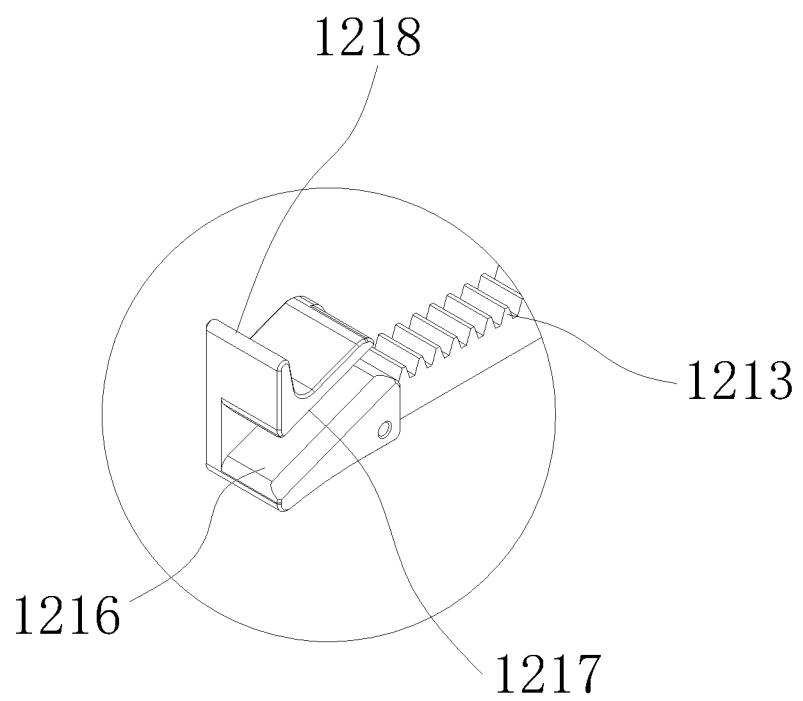
FIG. 3B is a partial enlarged view of FIG. 3A.

Referring to FIGS. 3A and 3B, the tooth rack 121 may include a main body part 1211 and a fixed part 1212 connected to an end of the main body part 1211. The main body part 1211 may be arranged surrounding an outer wall of the lens barrel of the image capturing device 300 for at least a circle, the other end (that is, the end of the main body 1211 not connected to the fixed part 1212) may be fixed to the fixed portion 1212, so that the tooth rack 121 can be fixed to the lens barrel conveniently and quickly, and the main body 1211 can be fixedly sleeved at the outer side wall of the lens barrel through the matching of the main body 1211 with the fixed part 1212, to prevent the main body 1211 from being loosely connected with the lens barrel which makes it difficult for the lens barrel to rotate with the tooth rack 121. In one embodiment, after the main body part 1211 is wound around the outer side wall of the lens barrel of the image capturing device 300 for one circle, the other end may be fixed to the fixed part 1212. When the tooth rack 121 is sleeved and fixed on the outer side wall of the lens barrel, the main body part 1211 and the fixed part 1212 can be both attached to the outer side wall of the lens barrel.

The main body part 1211 may be provided with a tooth part 1213, the tooth part 1213 may be arranged away from the outer side wall of the lens barrel, and the gear 122 may mesh with the tooth part 1213. Specifically, the teeth of the outer ring of the gear 122 may mesh with the tooth part 1213, and in the existing technology, the teeth may mesh with the tooth part 1213 to transmit force, which will not be described here in detail.

Figure 3C:
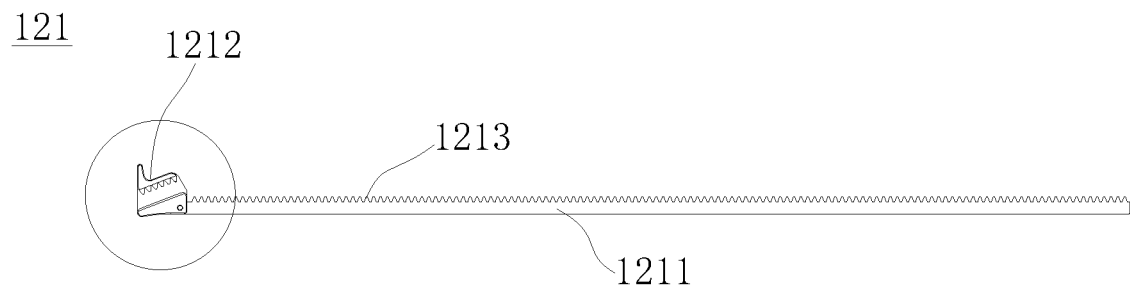
FIG. 3C is a cross-sectional diagram of the transmission assembly according to an embodiment of the present disclosure.
Figure 3D:
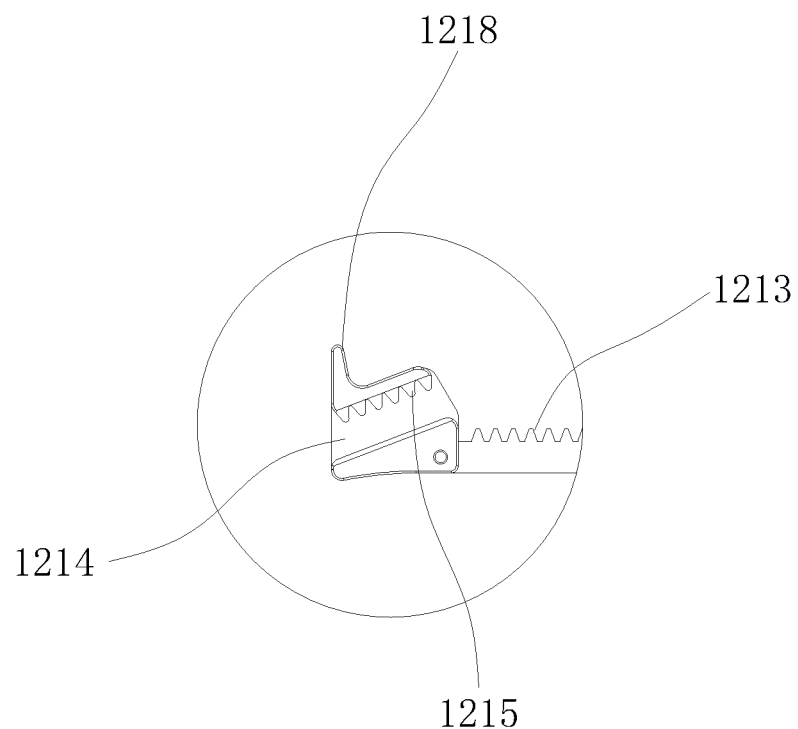
FIG. 3D is a partial enlarged view of FIG. 3C.

In some embodiments, referring to FIGS. 3C and 3D, the fixed part 1212 may be provided with a locking slot 1214, and an end of the main body part 1211 away from the fixed part 1212 may be snap-connected to the locking slot 1214. Specifically, the locking slot 1214 may be provided with an engagement tooth 1215. After the main body part 1211 is inserted into the locking slot 1214 at the end away from the fixed part 1212, the main body part 1211 may be inserted into the locking slot 1214. The tooth part 1213 may be snap-fitted with the engagement teeth 1215, so that the other end of the main body part 1211 can be fixed to the fixed portion 1212, and the main body part 1211 can be fixed to the lens barrel.

As shown in FIGS. 3A to 3D, the locking slot 1214 may include a first inclined surface 1216 and a second inclined surface 1217 opposite to the first inclined surface 1216, and the engagement teeth 1215 may be arranged at the second inclined surface 1217, an opening may be formed between the first inclined surface 1216 and the second inclined surface 1217 for the end of the main body part 1211 away from the fixed part 1212 to pass through. Such a structural design can make it easier for the end of the main body part 1211 away from the fixed part 1212 to be inserted into the locking slot 1214 to engage with the engagement teeth 1215 in the locking slot 1214.

Furthermore, the fixed part 1212 may be further provided with a gripping end 1218. In some embodiments, the gripping end 1218 may be disposed at a side of the fixed part 1212 away from the outer side wall of the lens barrel. When the tooth rack 121 is fixed to the lens barrel, the fixed part 1212 may abut against the outer side wall of the lens barrel by operating the gripping end 1218, and then the end of the main body part 1211 away from the fixed part 1212 may be tightened and inserted into the locking slot 1214 of the fixed part 1212 to implement the connection between the main body part 1211 and the fixed part 1212, thereby fixing the tooth rack 121 to the lens barrel.

Of course, the fixing method of the main body part 1211 and the fixed part 1212 is not limited to the above-mentioned fixing method, and any existing fixing connection method may be selected, such as connecting the main body by thread and screw fitting to fix the other end of the main body part 1211 to the fixed part 1212.

In addition, in some embodiments, the fixed part 1212 can be fixed at different positions of the main body part 1211, so that the diameter of the circle formed by the tooth rack 121 can adapt to an outer diameter of the lens barrel of the tooth rack 121. In certain other embodiments, the diameter of the circle enclosed by the tooth rack 121 can be adjusted, so that the tooth rack 121 can be placed at different parts of the lens barrel to adjust different lens parameters. Further, the lens parameters may include a focal length, an aperture, and a zoom of the image capturing device 300. Specifically, three components that can be rotated and adjusted may be disposed at the lens barrel to adjust the focal length, the aperture and the zoom of the image capturing device 300. The tooth rack 121 may be respectively sleeved at three components that can rotate and be adjusted for parameters. The tooth rack 121 may rotate under the drive of the gear 122 to drive the currently sleeved components that can rotate and be adjusted for parameters to adjust corresponding lens parameters.

Figure 4:
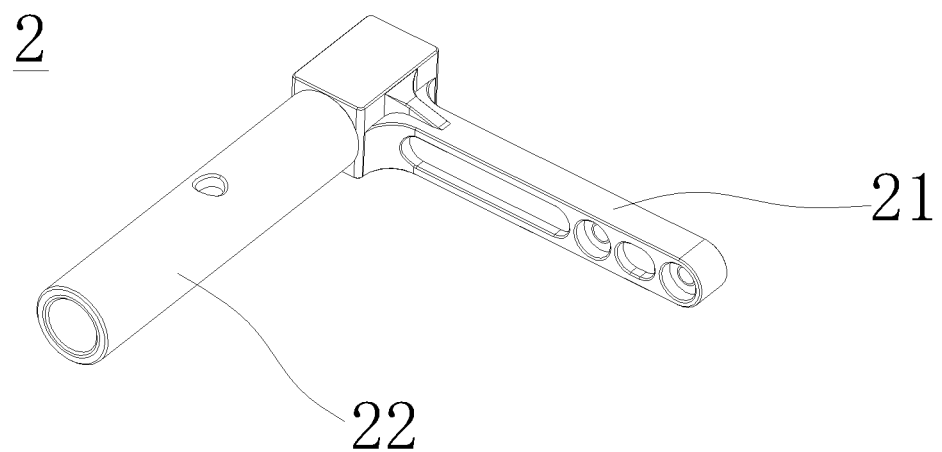
FIG. 4 illustrates a perspective view of a connection member according to an embodiment of the present disclosure.

Referring to FIG. 4, the connection member 2 may include a first connection part 21 configured to connect the carrying portion 400 of the gimbal and a second connection portion 22 configured to connect with the electric motor 11. The first connection part 21 may be connected to the second connection part 22, and an angle may be formed between the first connection part 21 and the second connection part 22. In some embodiments, the angle may be 90°, or may be an acute angle, for example, 30°, 45°, 60°, and so on.

In one embodiment, the fixing of the first connection part 21 to the carrying part 400 can be implemented by existing connection methods such as snap connection, threaded connection, and plug-in connection. The fixing connection method with the carrying part 400 will not be described here in detail.

Referring to FIG. 2, the electric motor 11 may further include a fixed member 14 disposed at the housing 111, and the second connection part 22 may be detachably connected to the fixed member 14. The detachable connection manner of the second connection part 22 and the fixed member 14 can be a snap connection, a threaded connection, a plug connection, and the like. Further, the second connection part 22 may be a connection pipe, and the fixed member 14 may include a plug-in hole 141 with a retractable diameter. The second connection part 22 can be inserted into the plug-in hole 141. By providing the plug-in hole 141 with the retractable diameter, it can adapt to connection pipes of different diameters and can effectively avoid mounting interference.

The retractable diameter of plug-in hole 141 can be implemented in multiple ways. In some embodiments, for example, the fixed member 14 may be made of elastic material, and the plug-in hole 141 may be inserted with connection pipes having different diameters. The diameter can be changed by elastic force to adapt to the connection pipes having the different diameters.

In some embodiments, the fixed member 14 may include an operation portion that can adjust the diameter of the plug-in hole 141 when under operation such as rotation. Specifically, the operation portion can rotate relative to the housing 111 to be selectively in an unlocked state or a locked state. When the operation portion is in the unlocked state, the diameter of the plug-in hole 141 may be at a largest size (for example, may be slightly larger than the diameter of the connection pipe), and at this point, the second connection part 22 can be inserted into the plug-in hole 141. Next, the operation portion may be rotated to the locked state. During the process of switching the operating portion from the unlocked state to the locked state, the diameter of the plug-in hole 141 may gradually decrease (e.g., which can make an interference fit of the connection pipe and the plug-in hole 141), so that the second connection portion 22 can be firmly fixed to the fixed member 14. When the second connection part 22 needs to be detached from the plug-in hole 141, the operation portion can be switched from the locked state to the unlocked state. When the operation portion is switched from the locked state to the unlocked state, the diameter of the plug-in hole 141 may gradually increase.

Returning to FIG. 2, the housing 111 may include a third inclined surface 15, the fixed member 14 may be connected to the inclined surface, and the electric motor 11 may adapt to lens barrels of different sizes.

Further, the power assembly 1 may further include a connection wire 13 configured to connect with the gimbal. In some embodiments, the connection wire 13 may include a power cord, so that the power assembly 1 can be supplied with power through the gimbal and no additional power supply is required to supply power to the power assembly 1, thereby reducing weight and volume of the focus adjustment device. In some embodiments, the connection wire 13 may include a signal wire to implement signal transmission between the gimbal and the power assembly 1. In some embodiments, the connection wire 13 may include a power wire and a signal wire.

The type of the adjustment member 3 can be selected according to actual needs. For example, it can be a control hand wheel, a knob, or other adjustment structures. In one embodiment, the adjustment member is a control hand wheel.

Figure 5:
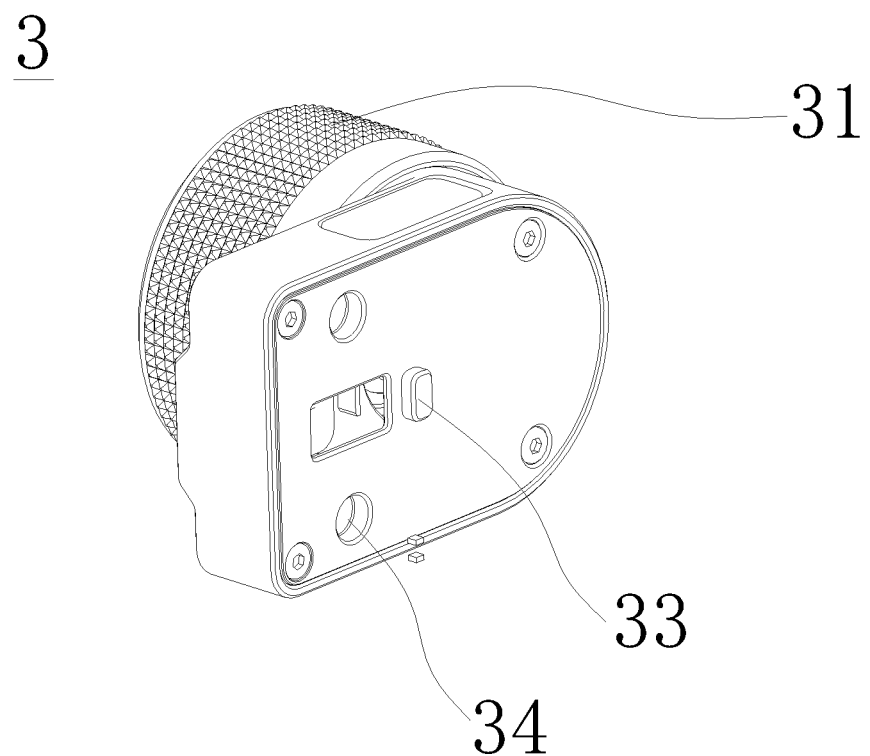
FIG. 5 illustrates a perspective view of an adjustment member according to an embodiment of the present disclosure.
Figure 6:
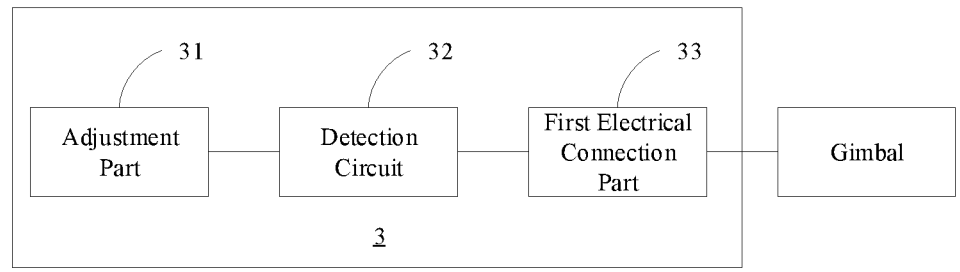
FIG. 6 is a structural block diagram of the adjustment member according to an embodiment of the present disclosure.

Referring to FIGS. 5 and 6, the adjustment member 3 may include a first electrical connection part 33 configured to electrically connect with the gimbal, so that the control signal of the adjustment member 3 can be transmitted through the first electrical connection part 33 to the gimbal, and the gimbal may rotate the electric motor 11 according to the control signal. In addition, the gimbal can also supply power to the adjustment member 3 through the first electrical connection portion 33, without any additional power supply.

Specifically, the adjustment member 3 may further include an adjustment part 31 and a detection circuit 32 connected to the adjustment part 31. The detection circuit 32 may be electrically connected to the first electrical connection part 33. Optionally, the detection circuit 32 may include a sensor (when the adjustment member 3 is a control hand wheel, the sensor may be an angle sensor) and a processor connected to the sensor, and the first electrical connection part 33 may be electrically connected to the processor. The sensor is configured to obtain an amplitude of the adjustment part 31 under operation and send it to the processor, and the processor may generate a control signal according to the received magnitude of the amplitude, and send it to the gimbal through the first electrical connection part 33. In certain other embodiments, the detection circuit 32 may include a sensor that is electrically connected to the first electrical connection part 33, and the sensor may be configured to detect the magnitude of the adjustment part 31 under operation and send it to the gimbal through the first electrical connection part 33. The gimbal may generate a control signal according to the received amplitude.

The first electrical connection part 33 may include a telescopic probe, an electrical contact (i.e., a metal contact), and the like.

Further, the adjustment member 3 may further include a first fixed end 34 configured to connect with the gimbal. The first fixed end 34 may be a fixed hole, or a plug-in protrusion, a fixed hole, or a screw matching the fixed hole.

Further, the first electrical connection part 33 may include a plurality of electrical contacts, and the plurality of first electrical contacts are distributed around the first fixed end 34 to fix the adjustment member 3 to the gimbal for improving the stability of the communication between the plurality of first electrical contacts and the gimbal.

Figure 7:
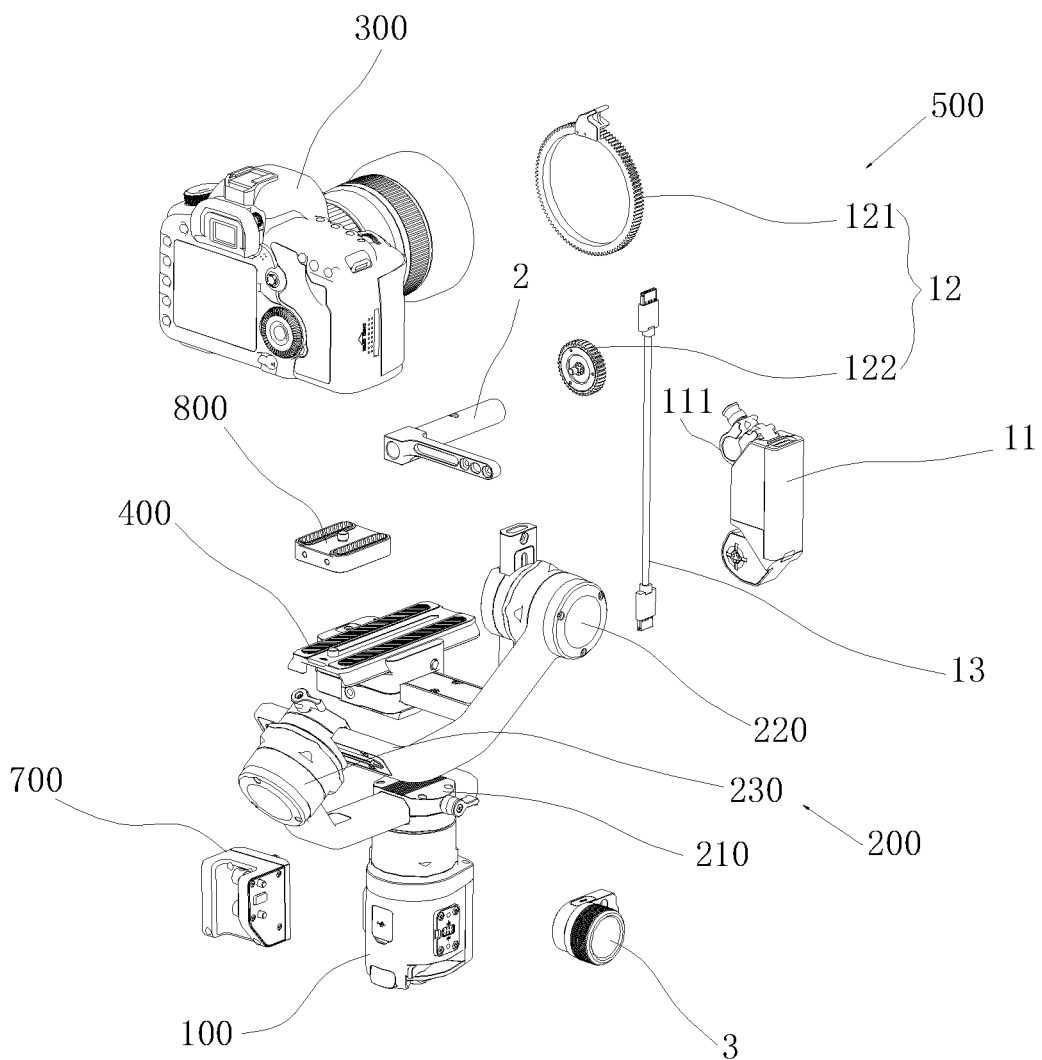
FIG. 7 is an exploded view of a structure of a gimbal in a first use state according to an embodiment of the present disclosure.
Figure 8:
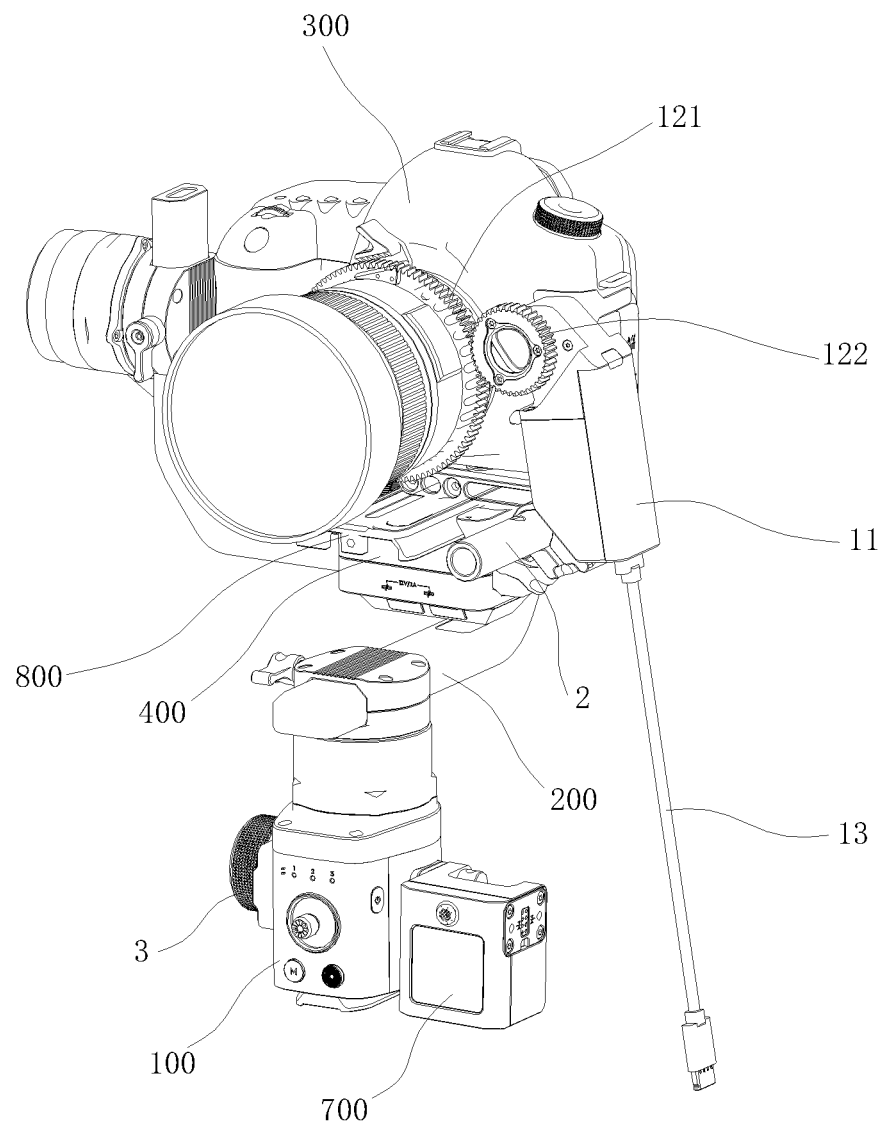
FIG. 8 illustrates a perspective view of the gimbal in the first use state according to an embodiment of the present disclosure.
Figure 9:
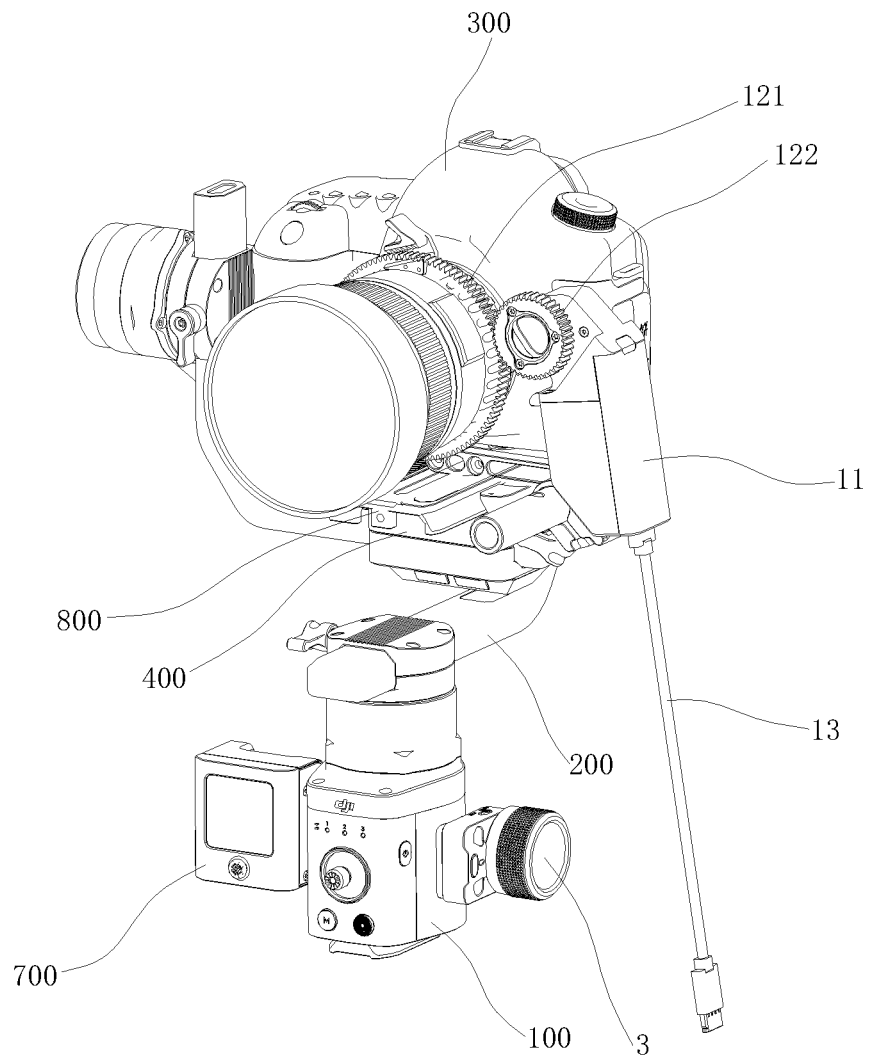
FIG. 9 illustrates a perspective view of the gimbal in a second use state according to an embodiment of the present disclosure.

In some embodiments, with reference to FIGS. 7-9, the gimbal is provided, including: a hand-held assembly 100, an axis assembly 200 fixed on the hand-held assembly 100, and a carrying part 400 connected to the axis assembly 200 and configured to fix a image capturing device 300, and at least one follow focus device 500. The structure, function, operation principle and effects of the follow focus device 500 may be referred to the above description, which will not be repeated here.

Further, the shaft assembly 200 may include a bracket and an electric motor for driving the bracket.

The gimbal may be a two-axis gimbal, a three-axis gimbal, or a four-axis gimbal. In one embodiment, the gimbal is a three-axis gimbal, the axis assembly 200 includes a yaw axis assembly 210, a pitch axis assembly 220, and a roll axis assembly 230. The carrying part 400 may be fixed to the pitch axis assembly 220.

The image capturing device 300 may be a camera, or an imaging unit assembled from a lens and an image sensor.

In conjunction with FIGS. 7 to 9, in some embodiments, the gimbal may further include an elevation block 800. The elevated block 800 may be fixed on the carrying part 400, the connection member 2 of the image capturing device 300 and the follow focus device 500 may be fixed on the elevation block 800. Further, the elevation block 800 may be disposed at the carrying part 400 to satisfy a height requirement for the image capturing device 300 and the connection member 2 to be fixed on the carrying part 400. Specifically, the image capturing device 300 and the connection member 2 can be fixed to the elevation block 800 by any existing fixing method. For example, the image capturing device 300 can be fixed on the elevation block 800 by screws and the connection member 2 can be fixed on the elevation block by threads.

Figure 11:
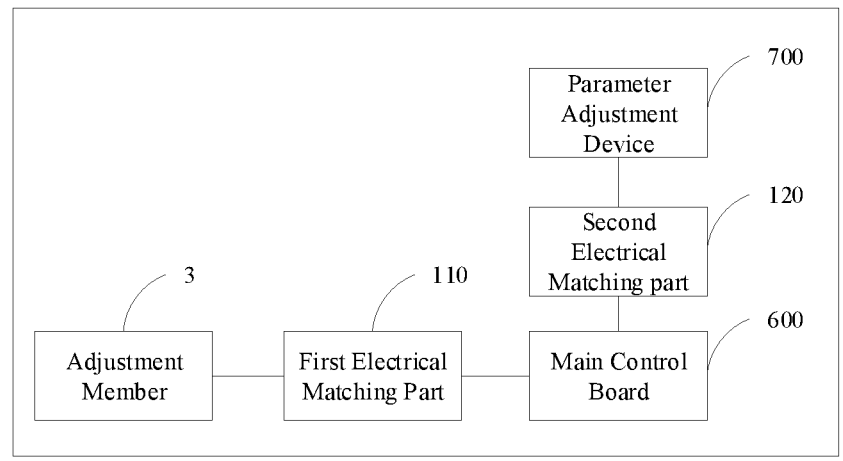
FIG. 11 is another structural block diagram of the gimbal in the first use state according to an embodiment of the present disclosure.
Figure 12:
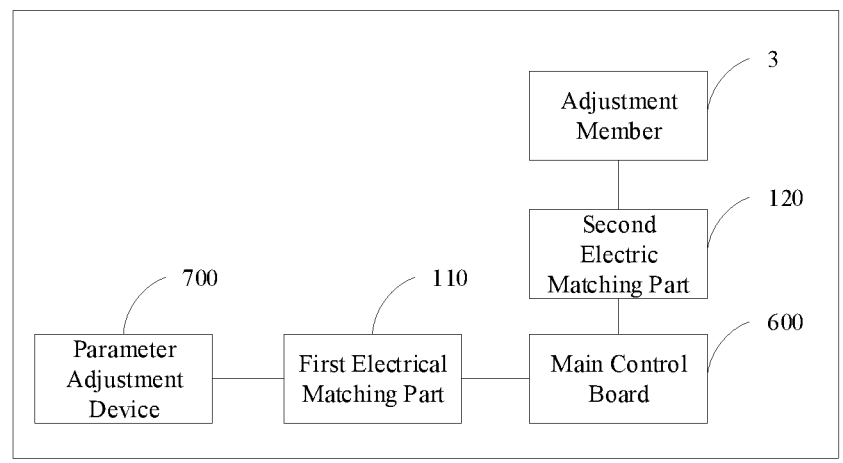
FIG. 12 is a structural block diagram of the gimbal in the second use state according to an embodiment of the present disclosure.

With reference to FIGS. 11-12, the gimbal may further include a main control board 600 arranged in the hand-held assembly 100. The main control board 600 may be electrically connected to the axis assembly 200, the adjustment member 3, and the power assembly 1, respectively, and the adjustment member 3 may be electrically connected to the power assembly 1 through the main control board 600. The adjustment member 3 may generate a control signal and send it to the main control board 600, and the main control board 600 may rotate the power assembly 1 according to the control signal.

The power assembly 1 may further include a connection wire 13, and the power assembly 1 may be connected to the main control board 600 through the connection wire 13. In an embodiment, the connection wire 13 may include a power cord, so that the power unit 1 can be supplied with power through the gimbal, and no additional power supply may be required for supplying power to the power unit 1, thereby reducing the weight and volume of the focus adjuster. In certain other embodiments, the connection wire 13 may include a signal wire to transmit a signal between the gimbal and the power assembly 1. In certain other embodiments, the connection wire 13 may include a power wire and a signal wire.

Returning to FIGS. 11 and 12, the gimbal may further include a first electrical matching part 110, which can be disposed at the hand-held assembly 100 and be electrically connected to the main control board 600. In addition, the first electrical matching part 110 can be detachably electrically connected to the first electrical connection part 33 of the adjustment member 3. In one embodiment, the first electrical matching part 110 includes a telescopic probe, an electrical contact point, and the like. Specifically, when the first electrical connection part 33 includes the telescopic probe, the first electrical matching part 110 may include the electrical contact; and when the first electrical connection part 33 includes the electrical contact, the first electrical matching part 110 may include the telescopic probe. Further, in some embodiments, the first electrical matching part 110 and the first electrical connection part 33 may be respectively male and female heads of an electrical connector of the same model, which can be convenient for the gimbal to adapt to the electrical connection part corresponding to the adjustment member 3.

In a possible implementation manner, the first electrical connection part 33 may include a plurality of first electrical contacts, the first electrical matching part 110 may include a plurality of first telescopic probes, and the plurality of the first electrical contacts can match with the plurality of the first telescopic probes. In some embodiments, the first electrical connection part 33 may include six first electrical contacts, and the first electrical matching part 110 may include six first telescopic probes. The six first electrical contacts may be arranged at intervals in two rows, and correspondingly, the 6 first telescopic probes may also be arranged at intervals in two rows. In addition, to ensure the stability of the communication between the first electrical contact and the first telescopic probe, the plurality of the first telescopic probes can be distributed around a first mounting part, and the plurality of first electrical contacts can also be distributed around the first fixed end 34.

Further, there may be two first electrical matching parts 110, which can be respectively disposed at both sides of the hand-held assembly 100, and the first electrical connection part 33 can be detachably electrically connected to one of the first electrical matching parts 110 to adapt to operation by left hand or right hand and meet different user's requirements. In one embodiment, if a connection between the first electrical connection part 33 and one of the two first electrical matching parts 110 is at the first use state of the gimbal, then a connection between the first electrical connection part 33 and the other of the two electrical matching parts 110 may be at the second use state.

Further, the gimbal may include the first mounting part disposed at the hand-held assembly 100, and the first fixed end 34 of the adjustment member 3 can be detachably connected to the first mounting portion to fix the adjustment member 3 to the hand-held assembly 100. In a feasible implementation manner, the first mounting portion may be a threaded hole, and the first fixed end 34 may be a screw.

In addition, there may be one, two, three, or more follow focus device 500, and the number of the follow focus device 500 may be selected according to actual needs. In an embodiment, the gimbal may include multiple follow focus devices 500, and each follow focus device 500 may be configured to adjust a lens parameter. For example, the gimbal may include two follow focus devices 500, one of them may be configured to adjust the focal length of the image capturing device 300 and the other one may be configured to adjust the aperture of the image capturing device 300. Alternatively, the gimbal may include three follow focus devices 500 that may respectively adjust the focal length, the aperture and the zoom of the image capturing device.

Figure 20:
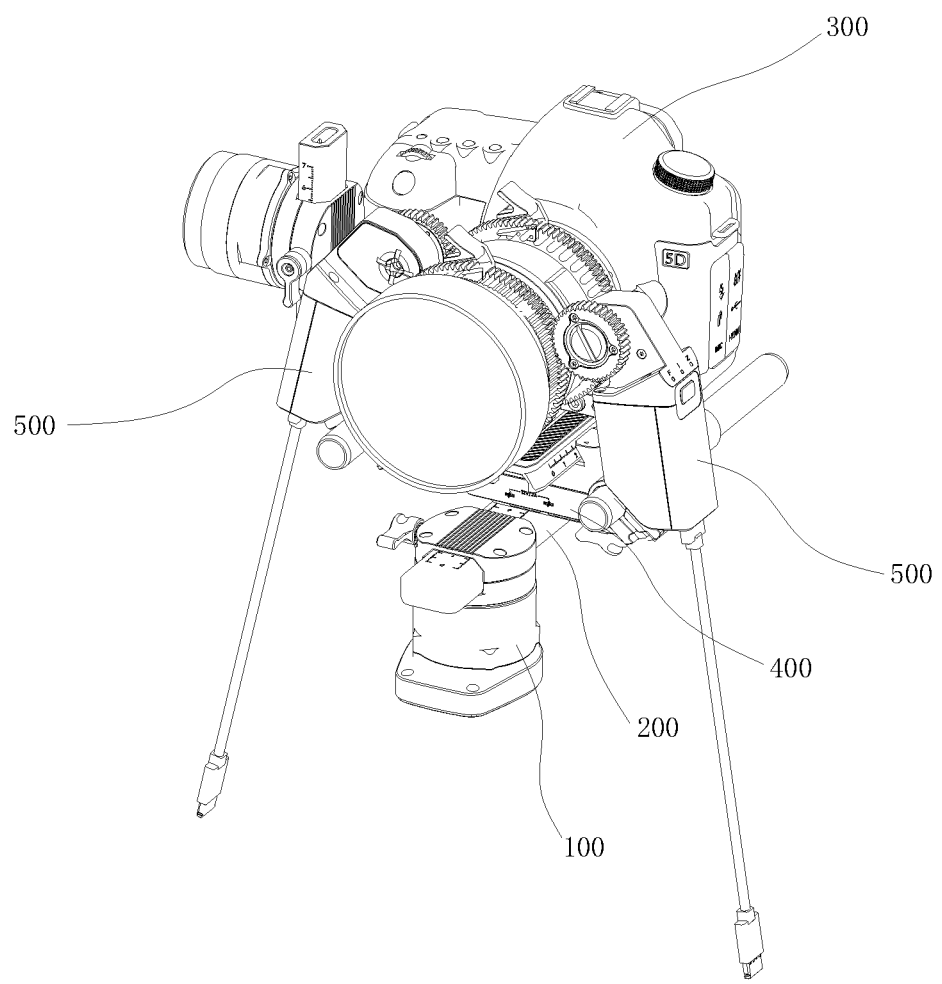
FIG. 20 illustrates a perspective view of the gimbal according to another embodiment of the present disclosure.

In one embodiment, the gimbal may include a follow focus device for adjusting the focal length of the image capturing device 300 and a follow focus device for adjusting the aperture of the image capturing device 300. Further, the mounting methods of the two follow focus devices 500 and other structures of the gimbal (such as the image capturing device 300, the carrying part 400, etc.) can be referred to the above-mentioned embodiments. Specifically, in one embodiment, the outer side wall of the lens barrel of the image capturing device 300 may be provided with a focus adjustment component and an aperture adjustment component. When the focus adjustment component and the aperture adjustment component are rotated, the focal length and the aperture of the image capturing device 300 can be adjusted correspondingly. The tooth rack 121 of one of the follow focus devices 500 may be sleeved at the focus adjustment component to drive the focal length adjustment component to rotate for adjusting the focal length of the image capturing device 300. The tooth rack 121 of the other follow focus device 500 may be sleeved at the aperture adjustment component to drive the aperture adjustment component to rotate for adjusting the aperture of the image capturing device 300. In one embodiment, the tooth racks 121 of the two follow focus devices 500 may be installed at the outer side wall of the lens barrel approximately in parallel. Further, referring to FIG. 20, two follow focus devices 500 may be arranged at both sides of the lens barrel, so that the two follow focus devices 500 can be easily mounted to the lens barrel and the structure after mounting can be compact.

In conjunction with FIGS. 7 to 12, the gimbal may further include a parameter adjustment device 700 connected to the hand-held assembly 100, and the parameter adjustment device 700 may be electrically connected to the main control board 600. In some embodiments, the parameter adjustment device 700 can replace the remote-control device (such as a remote-control, a mobile terminal, etc.) in the existing technology that is communicatively connected to the gimbal to operate the gimbal.

The parameter adjustment device 700 may have at least one of the following functions: (1) configure parameters of the gimbal, such as gimbal automatic calibration, automatic calibration gear selection, three-axis control parameter settings, etc.; (2) Smooth Track function (e.g., transmit movement of the gimbal according to an operator's action), three-axis parameter (e.g., rotation speed) gear principle custom setting function, etc.; (3) custom setting of gear selection of remote parameter, gimbal limit angle setting, etc.; (4) real-time viewing of parameters, such as balance, system calibration parameters, gimbal default parameters, gimbal Bluetooth password, etc.; (5) viewing of gimbal information, such as gimbal device name, password, SN code, version number, etc.

Figure 15:
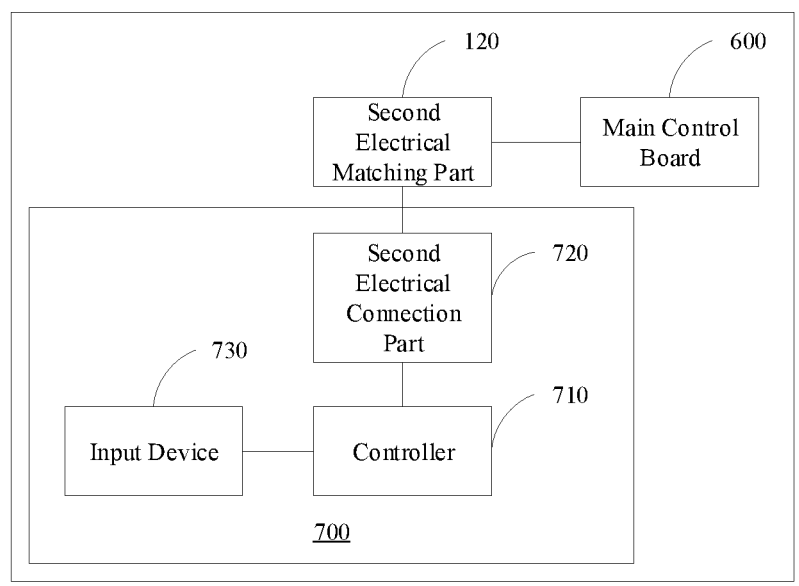
FIG. 15 is a schematic structural diagram of a usage scenario for a parameter adjustment device according to an embodiment of the present disclosure.
Figure 16:
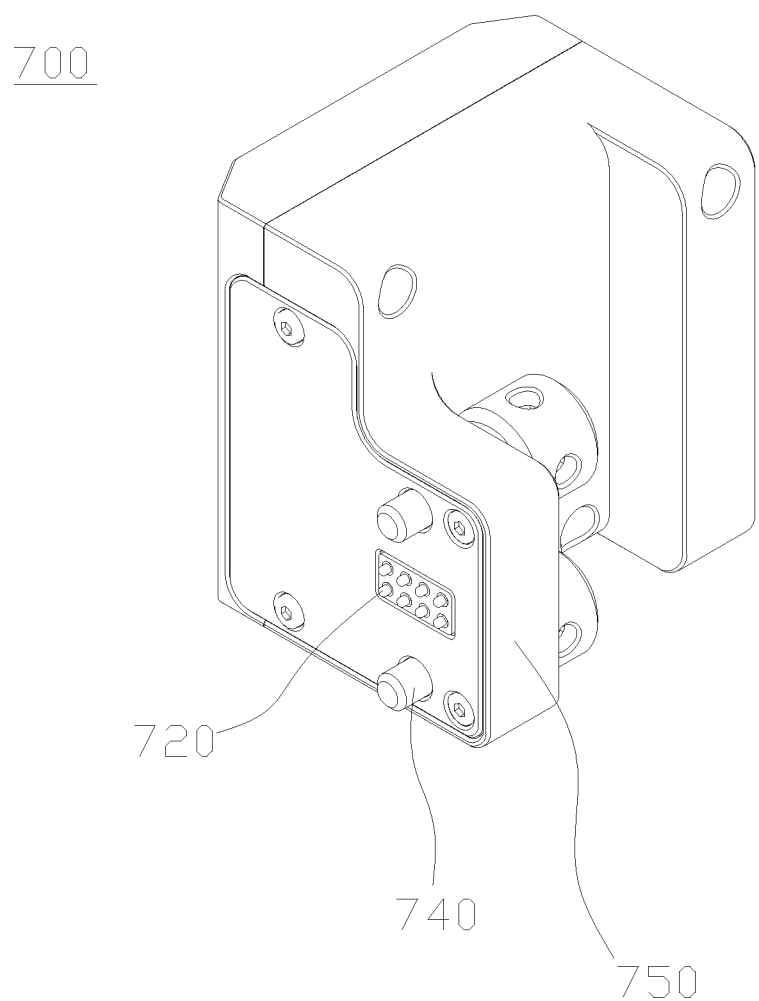
FIG. 16 illustrates a perspective view of the parameter adjustment device according to an embodiment of the present disclosure.

Referring to FIGS. 11, 15 and 16, the gimbal may include a second electrical matching part 120, which is disposed at the hand-held assembly 100 and is electrically connected to the main control board 600. The parameter adjustment device 700 may include a controller 710, a second electrical connection part 720 electrically connected to the controller 710, and an input device 730 electrically connected to the controller 710. The second electrical connection part 720 may be configured to be detachably electrically connected with the second electrical matching part 120, so that the parameter adjustment device 700 can be electrically connected to the main control board 600. The input device 730 is configured to set and/or display gimbal parameters and/or power assembly parameters.

In the embodiments of the present disclosure, a type of the controller 710 is not intended to be specifically limited. A single-chip microcomputer such as advanced RISC machines (ARM) and advanced virtual RISC (AVR) can be selected, or a programmable logic device such as a programmable logic controller (PLC) can be selected.

In one embodiment, the second electrical matching part 120 may include a telescopic probe, an electrical contact point, and the like. Specifically, when the second electrical connection part 720 includes the telescopic probe, the second electrical matching part 120 may include the electrical contact; and when the second electrical connection part 720 includes the electrical contact, the second electrical mating portion 120 may include the telescopic probe. Further, in some embodiments, the second electrical matching part 120 and the second electrical connection part 720 can be male and female connectors of an electrical connector of the same type, which is convenient for the gimbal to adapt to the electrical connection part corresponding to the parameter adjustment device 700.

In a possible implementation manner, the second electrical connection part 720 may include a plurality of second electrical contacts, the second electrical matching part 120 may include a plurality of second telescopic probes, and the plurality of the first electrical contacts may electrically match with the plurality of second telescopic probes. In some embodiments, the second electrical connection part 720 may include six second electrical contacts, and the second electrical matching part 120 may include six second telescopic probes. The six second electrical contacts can be arranged at intervals in two rows. Correspondingly, the six second telescopic probes can also be arranged at intervals in two rows. In addition, to ensure the stability of the communication between the second electrical contact and the second telescopic probe, the plurality of second telescopic probes may be distributed around a second mounting part, and the plurality of second electrical contacts may be distributed around the second fixed end 740.

A user can set the gimbal parameters (including the parameters of the axis assembly 200 and the parameters of the image capturing device 300) and/or the power assembly parameters by operating the input device 730. After receiving the gimbal parameters and/or power assembly parameters input through the input device 730 by the user, the controller 710 may send the gimbal parameters and/or power assembly parameters input by the user to the main control board 600 through the second electrical connection part 720 and the second electrical matching part 120. When the main control board 600 controls an operation of the gimbal, the main control board 600 controls the operation of the gimbal according to the gimbal parameters set by the user. When the main control board 600 controls an operation of the power assembly 1, the main control board 600 controls the power assembly 1 according to the power assembly parameters set by the user.

In addition, when the user needs to view the gimbal parameters and/or power assembly parameters, the user may operate the input device 730, and the controller 710 can obtain corresponding gimbal parameters and/or power assembly parameters from the main control board 600 and display them according to the user's instructions.

Figure 17:
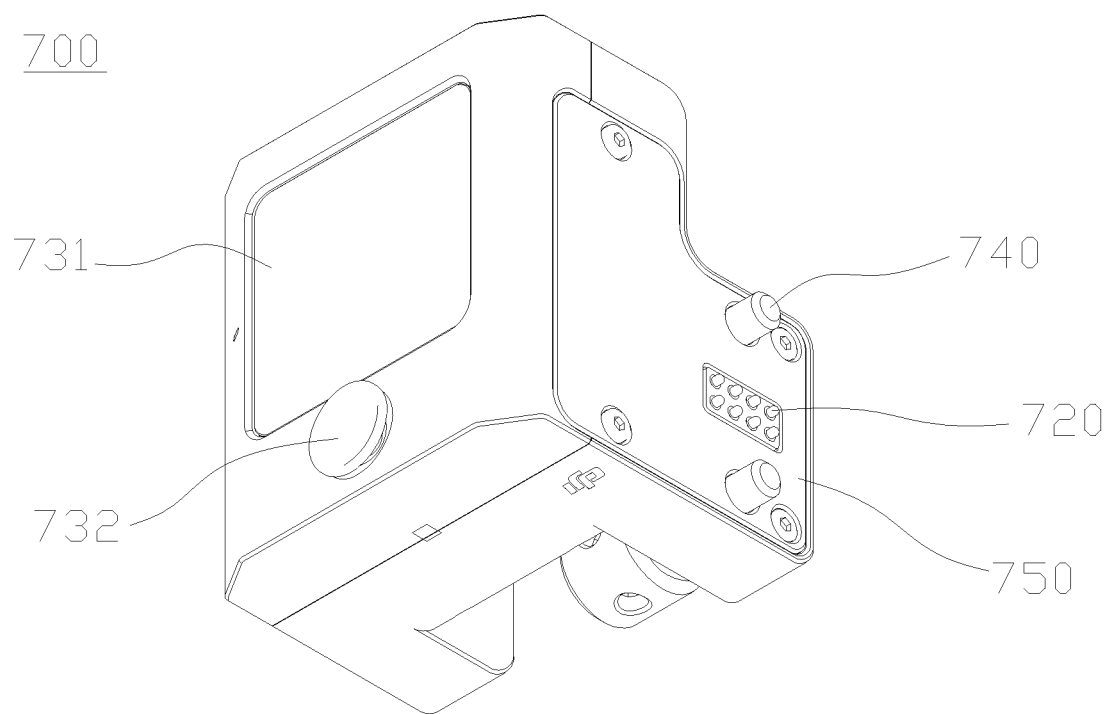
FIG. 17 illustrates a perspective view of the parameter adjustment device in another direction according to an embodiment of the present disclosure.

Referring to FIG. 17, in one embodiment, the input device 730 may include a display screen 731, button and/or knob 732. In some embodiments, the display screen 731 may be configured to display the gimbal parameters and/or power assembly parameters, and the button and/or knob 732 may be configured to set the gimbal parameters and/or power assembly parameters. In certain other embodiments, the button and/or knob 732 may only serve as a power control unit of the parameter adjustment device 700, and the user may set or obtain the gimbal parameters and/or power assembly parameters by operating the display screen 731.

Further, there may be two second electrical matching parts 120, which are respectively disposed at both sides of the hand-held assembly 100, and the second electrical connection part 720 can be detachably electrically connected to one of the first electrical matching parts 110 to meet the needs of left and right hand operation.

In some embodiments, the first electrical matching part 110 and the second electrical matching part 120 may have the same structure, that is, the first electrical matching part 110 can be configured to be detachably electrically connected to the first electrical connection part 33 of the adjustment member 3 for implementing the communication connection between the adjustment member 3 and the main control board 600, and can also be configured to detachably electrically connected to the second electrical connection part 720 of the parameter adjustment device 700 for implementing the communication connection between the parameter adjustment device 700 and the main control board 600.

Further, the gimbal may include a second mounting portion disposed at the hand-held assembly 100, and the parameter adjustment device 700 may further include a second fixed end 740. The second fixing end 740 can be detachably connected to the second mounting portion to fix the parameter adjustment device 700 to the hand-held assembly 100. In a feasible implementation, the second mounting portion can be a threaded hole, and the second fixed end 740 can be a screw.

In addition, with reference to FIGS. 16 and 17, the parameter adjustment device 700 may include a housing, and the controller 710 may be disposed at the housing. The housing may include two opposite side parts and a front part located between the two side parts. The first electrical connection part 33 may be disposed at one side portion, the second electrical connection part 720 may be disposed at the other side portion, and the input device 730 may be disposed at the front part.

The housing may be provided with a protrusion portion 750, and the second electrical connection part 720 and the second fixed end 740 may be disposed at the protrusion portion 750, which facilitates the mounting of the parameter adjustment device 700 to the hand-held assembly 100.

Figure 10:
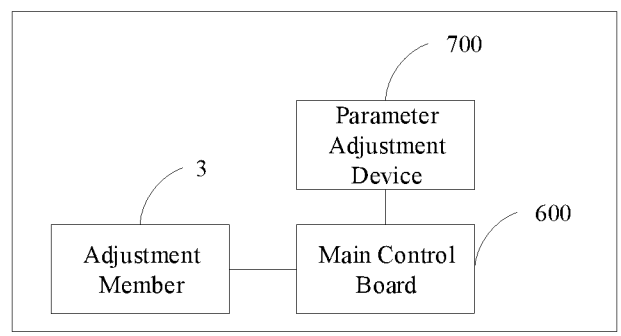
FIG. 10 is a structural block diagram of the gimbal in the first use state or the second use state according to an embodiment of the present disclosure.

Thus, the adjustment member 3 and the parameter adjustment device 700 may be respectively electrically connected to the main control board 600, and the adjustment member 3 and the parameter adjustment device 700 may be disposed at both sides of the hand-held assembly 100, as shown in FIGS. 10-12.

Figure 13:
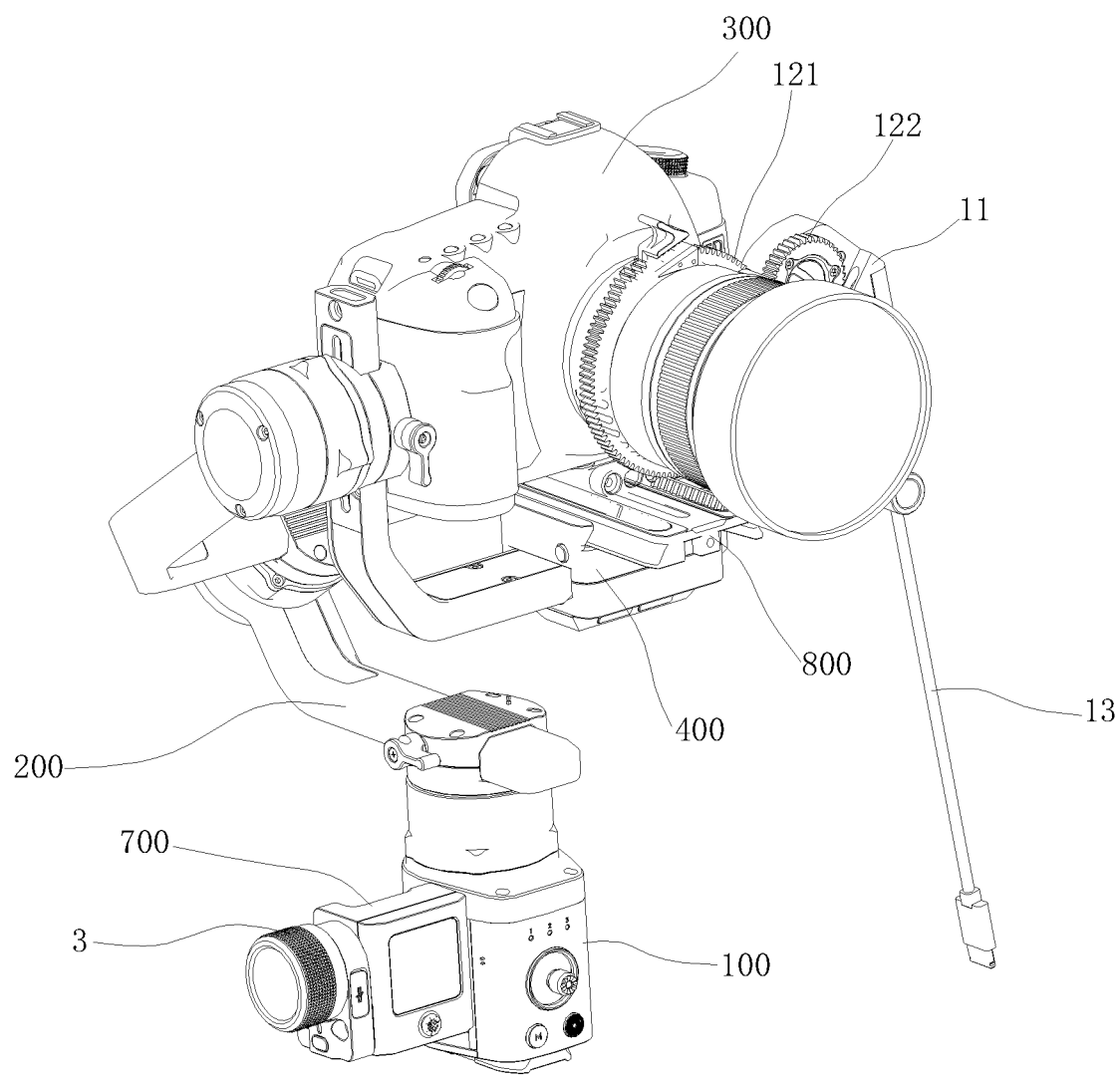
FIG. 13 illustrates a perspective view of the gimbal in a third use state according to an embodiment of the present disclosure.
Figure 14:
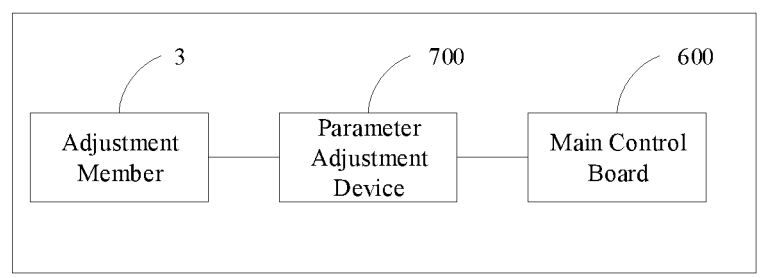
FIG. 14 is a structural block diagram of the gimbal in the third use state according to an embodiment of the present disclosure.
Figure 18:
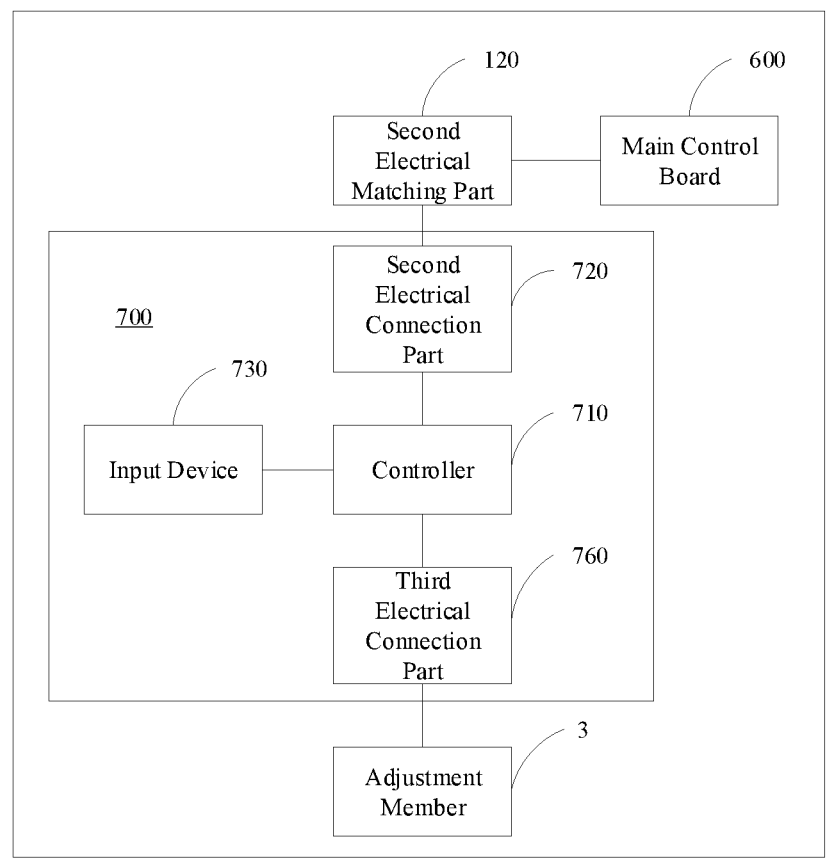
FIG. 18 is a schematic structural diagram of another usage scenario for the parameter adjustment device according to an embodiment of the present disclosure.

In certain other embodiments, with reference to FIGS. 13, 14, and 18, the adjustment member 3 can be fixed to the hand-held assembly 100, and may be electrically connected to the main control board 600 through the parameter adjustment device 700 (i.e., in the third use state of the gimbal). The control signal generated by the adjustment member 3 may be transmitted to the main control board 600 via the parameter adjustment device 700. In one embodiment, the adjustment member 3 and the parameter adjustment device 700 may be arranged on the same side of the hand-held assembly 100.

Specifically, the parameter adjustment device 700 may further include a third electrical connection part 760 for electrically connecting with the controller 710. The second electrical connection may be configured to be detachably electrically connected to the second electrical matching part 120, so that the parameter adjustment device 700 can be electrically connected to the main control board 600. The third electrical connection part 760 may be detachably electrically connected to the first electrical connection part 33, so that the adjustment member 3 and the parameter adjustment device 700 can be electrically connected.

Figure 19:
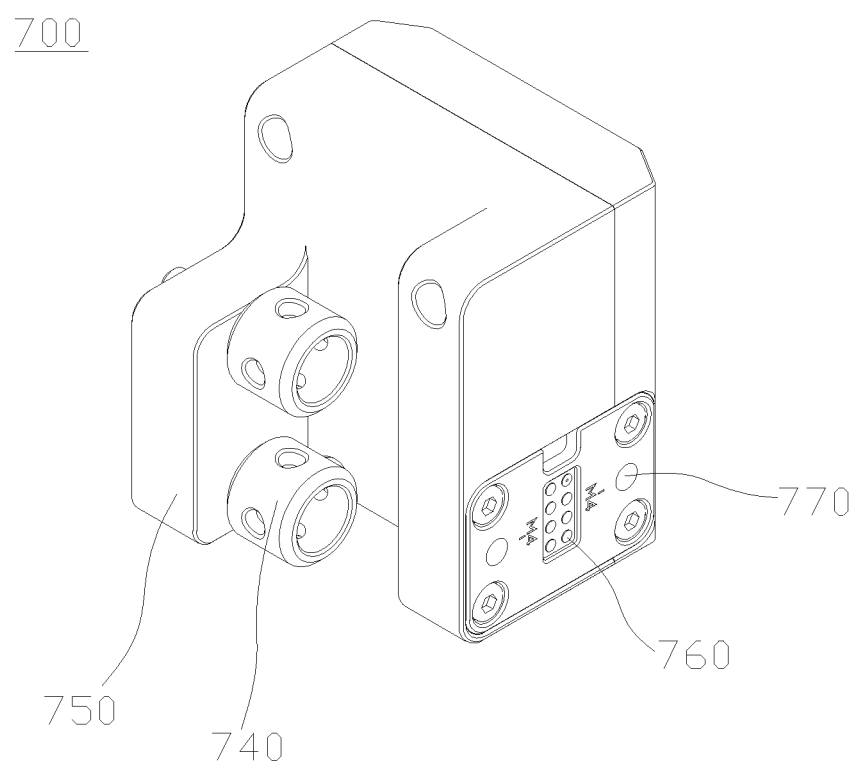
FIG. 19 is a perspective view of the parameter adjustment device in another direction according to an embodiment of the present disclosure.

Further, the adjustment member 3 may include a third fixed end. Referring to FIG. 19, the parameter adjustment device 700 may further include a third mounting portion 770, and the third fixed end may be detachably connected to the third mounting portion 770 to fix the adjustment member 3 to the parameter adjustment device 700. In a feasible implementation manner, the third mounting portion 770 can be a threaded hole, and the third fixed end can be a screw.

In addition, when the gimbal includes multiple follow focus devices 500, the power assembly 1 of the multiple follow focus devices 500 can be controlled by different control devices or structures. For example, if the gimbal includes two follow focus devices 500, the adjustment member (e.g., control hand wheel) may be used to control the power assembly 1 of one follow focus device 500, and the button and/or knob 732 (e.g., five-dimensional button) of the parameter adjustment device 700 may be used to control the power assembly 1 of the other follow focus device 500.

In the description of the present disclosure, the terms "up", "down", "front", "rear", "left", and "right" shall be construed as the directions of "upper", "lower", "front", "rear", "left", and "right" with respect to the gimbal when the axis assembly 200 and the hand-held assembly 100 are installed sequentially from top to bottom.

It should be noted that in the specification, relational terms such as first and second are only used to distinguish one entity or operation from another entity or operation, and do not necessarily require or imply any such actual relationship or sequence among these entities or operations. The terms "include", "contain", or any other variants thereof are intended to cover non-exclusive inclusion, such that a process, method, product or device including a series of elements can include not only those elements, but also other elements that are not explicitly listed, or may include elements inherent to such process, method, product, or device. Without further restrictions, the element defined by the sentence "including a" does not exclude the existence of equivalent elements in the process, method, product, or device that contains the defined element.

In the embodiments of the present disclosure, the follow focus device and the gimbal having the follow focus device have been described above in detail. The specific examples in the specification are used to explain the principle and implementation of the disclosure. The description of the above embodiments is only for understanding the method and core idea of the disclosure. At the same time, for those skilled in the art, based on the idea of the disclosure, changes can be made in a specific implementation or to the application scope. In summary, the content of the specification should not be construed as limiting the disclosure.

What is claimed is:

1. A follow focus device for a gimbal carrying an image capturing device, comprising:
   a power assembly connected to the image capturing device, and configured to adjust at least one lens parameter of the image capturing device, the power assembly including a connection wire configured to connect the power assembly to the gimbal, and the power assembly being configured to be powered by the gimbal through the connection wire;
   a connection member configured to fix the power assembly to the gimbal; and
   an adjustment member electrically connected to the power assembly, wherein:
   the adjustment member generates a control signal to adjust the lens parameter of the image capturing device; and
   the power assembly receives the control signal from the adjustment member and, based on the control signal, rotates a part of the image capturing device to adjust the lens parameter of the image capturing device.

2. The follow focus device according to claim 1, wherein the power assembly comprises:
   an electric motor; and
   a transmission assembly,
   wherein the electric motor is electrically connected to the adjustment device, one end of the transmission assembly is connected to the electric motor, the other end of the transmission assembly is connected to image capturing device, and the electric motor rotates the part of the image capturing device through the transmission assembly.

3. The follow focus device according to claim 2, wherein the transmission assembly comprises:
   a tooth rack connected to the image capturing device; and
   a gear connected to the electric motor, the gear meshing with the tooth rack.

4. The follow focus device according to claim 3, wherein the tooth rack comprises:
   a main body including a tooth part; and
   a fixed part connected to one end of the main body, wherein:
   in response to the main body being disposed around an outer side wall of a lens barrel of the image capturing device for at least one circle, the other end of the main body is fixed to the fixed part; and
   the tooth part is disposed away from the outer side wall of the lens barrel, and the gear meshes with the tooth part.

5. The follow focus device according to claim 4, wherein:
   the fixed part is provided with a locking slot; and
   an end of the main body away from the fixed portion is connected to the locking slot by snap.

6. The follow focus device according to claim 5, wherein:
   an engagement tooth is disposed at the locking slot; and
   in response to the end of the main body away from the fixed part being inserted into the locking slot, the tooth part of the main body part matches with the engagement tooth by snap.

7. The follow focus device according to claim 6, wherein the locking slot comprises:
   a first inclined surface; and a second inclined surface opposite to the first inclined surface, wherein the engagement tooth is disposed at the second inclined surface, and an opening is formed between the first inclined surface and the second inclined surface for the end of the main body away from the fixed part to pass through.

8. The follow focus device according to claim 2, wherein the connection member comprises:
a first connection part configured to connect a carrying part of the gimbal; and
a second connection part configured to connect the electric motor, the first connection part being connected to the second connection part, and an angle being formed between the first connection and the second connection part.

9. The follow focus device according to claim 8, wherein:
the second connection part is a connection tube;
a fixed member of the electric motor includes a plug-in hole having a retractable diameter; and
the second connection part is inserted into the plug-in hole.

10. The follow focus device according to claim 8, wherein a housing of the electric motor comprises:
a third inclined surface connected to the fixed member.

11. The follow focus device according to claim 1, wherein the connection wire includes:
a power wire, and
a signal wire.

12. The follow focus device according to claim 1, wherein:
the adjustment member is a control hand wheel; and
the adjustment member comprises:
a first electrical connection part configured to be electrically connected to the gimbal.

13. The follow focus device according to claim 12, wherein the adjustment member further comprises:
a first fixed end configured to connect the gimbal, the first electrical connection part comprising:
a plurality of first electrical contacts distributed around the first fixed end.

14. The follow focus device according to claim 1, wherein the lens parameter comprises at least one of: a focal length parameter, an aperture parameter, and a zoom parameter.

15. The follow focus device according to claim 1, wherein:
the connection member includes a first connection part and a second connection part, the second connection part being a tube, and the second connection part being connected to the first connection part with at an angle relative to the first connection part, and the angle being an acute angle.

16. The follow focus device according to claim 1, wherein the lens parameter includes at least one of an aperture parameter or a zoom parameter.

17. A gimbal, comprising:
a hand-held assembly;
an axis assembly fixed on the hand-held component;
a carrying part connected with the axis assembly, being configured to fix an image capturing device; and
at least one follow focus device; wherein:
the follow focus device comprises:
a power assembly connected to the image capturing device, and configured to adjust at least one lens parameter of the image capturing device, the power assembly including a connection wire configured to connect the power assembly to the gimbal, and the power assembly being configured to be powered by a power supply of the gimbal through the connection wire, the power supply being external to the power assembly;
a connection member configured to fix the power assembly to the carrying part; and
an adjustment member electrically connected to the power assembly, wherein:
the adjustment member generates a control signal to adjust the lens parameter of the image capturing device; and
the power assembly receives the control signal from the adjustment member and, based on the control signal, rotates a part of the image capturing device to adjust the lens parameter of the image capturing device.

18. The gimbal according to claim 17, wherein the power assembly comprises:
an electric motor; and
a transmission assembly,
wherein the electric motor is electrically connected to the adjustment member, one end of the transmission assembly is connected to the electric motor, the other end of the transmission assembly is connected to the image capturing device, and the electric motor rotates the part of the image capturing device through the transmission assembly.

19. The gimbal according to claim 18, wherein the transmission assembly comprises:
a tooth rack connected to the image capturing device; and
a gear connected to the electric motor, the gear meshing with the tooth rack.

20. The gimbal according to claim 19, wherein the tooth rack comprises:
a main body including a tooth part; and
a fixed part connected to one end of the main body, wherein:
in response to the main body being disposed around an outer side wall of a lens barrel of the image capturing device for at least one circle, the other end of the main body is fixed to the fixed part; and
the tooth part is disposed away from the outer side wall of the lens barrel, and the gear meshes with the tooth part.

* * * * *